United States Patent
Kuo et al.

(10) Patent No.: US 7,139,107 B2
(45) Date of Patent: Nov. 21, 2006

(54) AUTOMATIC STATIC IMAGE CAPTURING DEVICE AND METHOD

(76) Inventors: Shih-Zheng Kuo, No. 21, Alley 8, Lane 57, Yu-Hsi St., Yungho, Taipei Hsien (TW); Yu-Ru Yu, No. 605, Po-Ai St., Chu-Pei, Hsinchu Hsien (TW)

( * ) Notice: Subject to any disclaimer, the term of this patent is extended or adjusted under 35 U.S.C. 154(b) by 898 days.

(21) Appl. No.: 09/967,569

(22) Filed: Sep. 27, 2001

(65) Prior Publication Data
US 2003/0058364 A1 Mar. 27, 2003

(51) Int. Cl.
*H04N 1/04* (2006.01)

(52) U.S. Cl. ............... 358/474; 358/486; 358/488; 358/497; 358/909.1

(58) Field of Classification Search ........... 358/486, 358/488, 909.1, 906, 406, 497, 494, 474, 358/505, 504; 382/318, 319, 312, 275, 313; 396/55, 54, 52; 348/208.13, 208.4, 208.5, 348/208.15, 209.99, 208.99; 399/211, 212
See application file for complete search history.

(56) References Cited
U.S. PATENT DOCUMENTS

| | | | | |
|---|---|---|---|---|
| 5,012,270 A * | 4/1991 | Sekine et al. | ............... | 396/54 |
| 5,500,745 A * | 3/1996 | Iishiba et al. | ............... | 358/461 |
| 5,790,490 A * | 8/1998 | Satoh et al. | ............... | 396/52 |
| 5,850,575 A * | 12/1998 | Ohishi | ............... | 396/52 |
| 5,890,018 A * | 3/1999 | Terui | ............... | 396/53 |
| 6,487,369 B1 * | 11/2002 | Sato | ............... | 396/52 |
| 6,583,928 B1 * | 6/2003 | Ooki et al. | ............... | 359/388 |
| 6,650,442 B1 * | 11/2003 | Chiu | ............... | 358/474 |
| 6,687,458 B1 * | 2/2004 | Masuda | ............... | 396/55 |
| 6,697,536 B1 * | 2/2004 | Yamada | ............... | 382/275 |
| 6,778,768 B1 * | 8/2004 | Ohkawara et al. | ............... | 396/55 |
| 6,802,611 B1 * | 10/2004 | Chu et al. | ............... | 353/28 |
| 6,810,207 B1 * | 10/2004 | Sato et al. | ............... | 396/54 |
| 6,982,746 B1 * | 1/2006 | Kawahara | ............... | 348/208.99 |

* cited by examiner

*Primary Examiner*—Cheukfan Lee
(74) *Attorney, Agent, or Firm*—Berkeley Law & Technology Group, LLC (57) ABSTRACT

A method and a device for automatic capturing of a static image. The automatic static image-capturing device is a scanner. The method includes the following steps. Any changes on a scanning platform are monitored. If a change in the static image on the scanning platform is detected, the change is gauged for a preset time interval to check for any further change during this time interval. If no further change is detected within this time interval, a preset operation is triggered.

15 Claims, 6 Drawing Sheets

AUTOMATIC STATIC IMAGE CAPTURING DEVICE AND METHOD

BACKGROUND OF THE INVENTION

1. Field of Invention

The present invention relates to a continuous static image capturing device and a method of operating the device. More particularly, the present invention relates to a continuous monitoring device capable of capturing a series of static images automatically.

2. Description of Related Art

Figure 1:
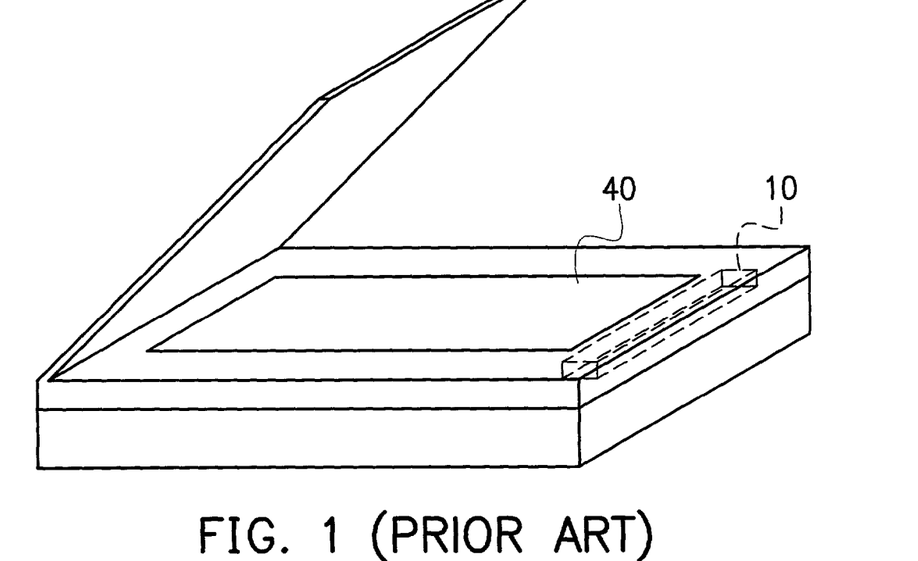
FIG. 1 is a perspective view of a conventional platform type scanner.
Figure 2:
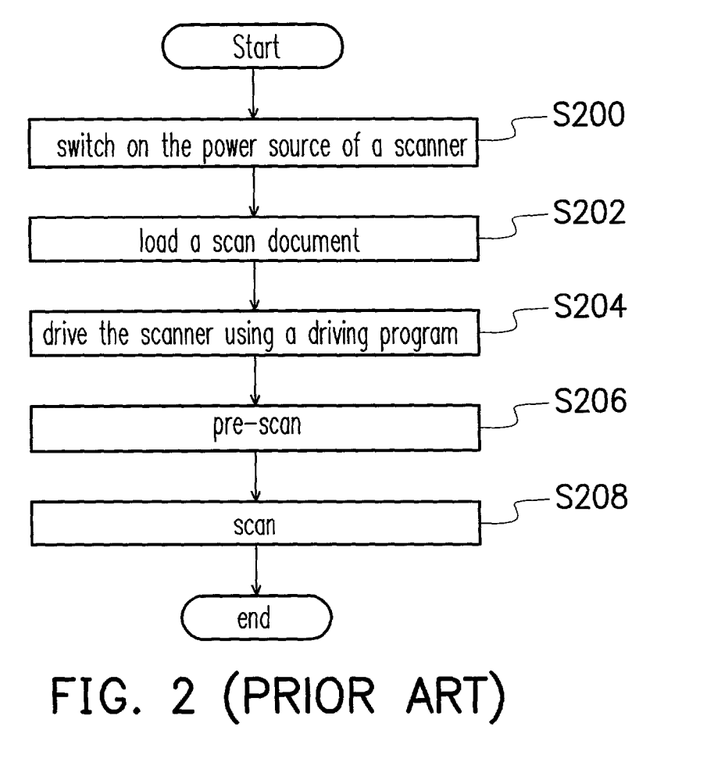
FIG. 2 is a listing of the steps required to operate a conventional platform scanner.

In an office or at home, the image of a document is usually captured by a scanner and then stored inside a computer as an electronic file. FIG. 1 is a perspective view of a conventional platform type scanner. FIG. 2 is a listing of the steps required to operate a conventional platform scanner. As shown in FIG. 2, a user must switch on the power source in step s200 and then place a scan document on a scanning platform in step s202.

However, in step s200, the user normally has to wait for a warm-up period before initiating an actual scanning. During this waiting period, the scanning head 10 is normally hidden behind the scanning platform 40 as shown in FIG. 1. In fact, the scanning head 10 may not be seen from above when a platform cover is raised. The scanning head 10 can be seen only when a driving program that drives the driving component inside the scanner in step 204 is initiated and subsequent pre-scanning step s206 and scanning step 208 is executed in sequence.

The scanning steps depicted in FIG. 2 present no problem. However, in an office environment, a peripheral device such as a scanner is often positioned in a central location and shared by a number of users. Users need to shuttle from their working desks to the scanner. Hence, it is always desirable to save time in the actual scanning operation.

A type of device that can replace a conventional camera in capturing images from a scene is the digital camera. However, a common drawback of both conventional and digital cameras is that a photographer must be present to initiate the image capture. In actual fact, the image of a static scene such as a flower can be captured automatically without having to have a photographer on standby. Hence, a device capable of capturing a static scene in the absence of a photographer is a great convenience to users.

SUMMARY OF THE INVENTION

Accordingly, one object of the present invention is to provide a scanning device for capturing a static scene automatically capable of speeding up image processing and simplifying static image scanning by scanners or digital cameras.

The scanner includes a scanning platform serving as a location for capturing static images. The automatic static image-capturing device includes a scanning head, an image-capturing device, a buffer and a logic decision device.

The scanning head is mounted underneath the scanning platform for continuous detection of static scenes by a to-and-fro movement. The image-capturing device is an element for capturing a static image and transforming the image into image data. The buffer is connected to the image-capturing device for holding previously captured image data from the image-capturing device. The logic decision device is coupled to the image-capturing device and the buffer for deciding whether the data registered inside the buffer and image data captured by the image-capturing device in a subsequent image-capturing operation are identical or not.

This invention also provides a method of capturing a static image automatically. The method aims to capture the static image of a scan document and includes the following steps. Any changes on a scanning platform are monitored. If a change in the static image on the scanning platform is detected, the change is gauged for a preset time interval to check for any further change during this time interval. If no further change within this preset time interval is detected, a preset operation such as a pre-scanning operation or a scanning operation is triggered.

This invention also provides an alternative method of capturing a static image automatically. The method aims to capture the static image of a scene and includes the following steps. Any changes in a static scene are continuously checked. If a change in the static scene is detected, the change is gauged for a preset time interval to check for any further change during this time interval. If no further change within this preset time interval is detected, the static scene is captured in a scanning operation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
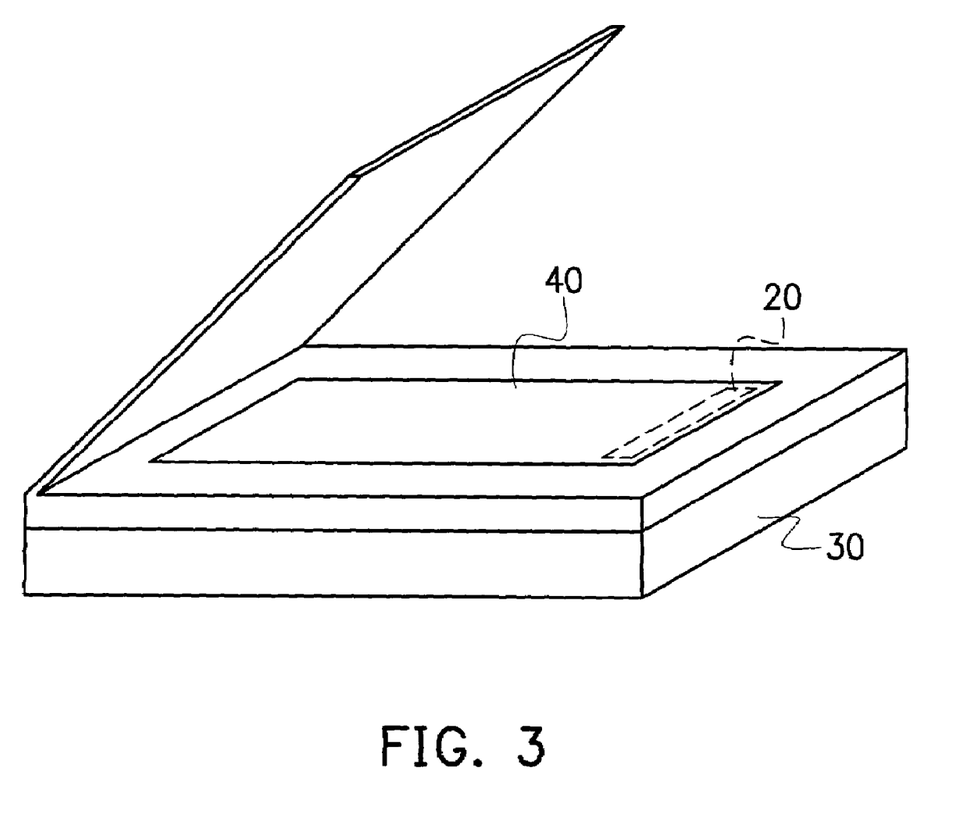
FIG. 3 is a perspective view of a platform type scanner according to this invention.
Figure 4:
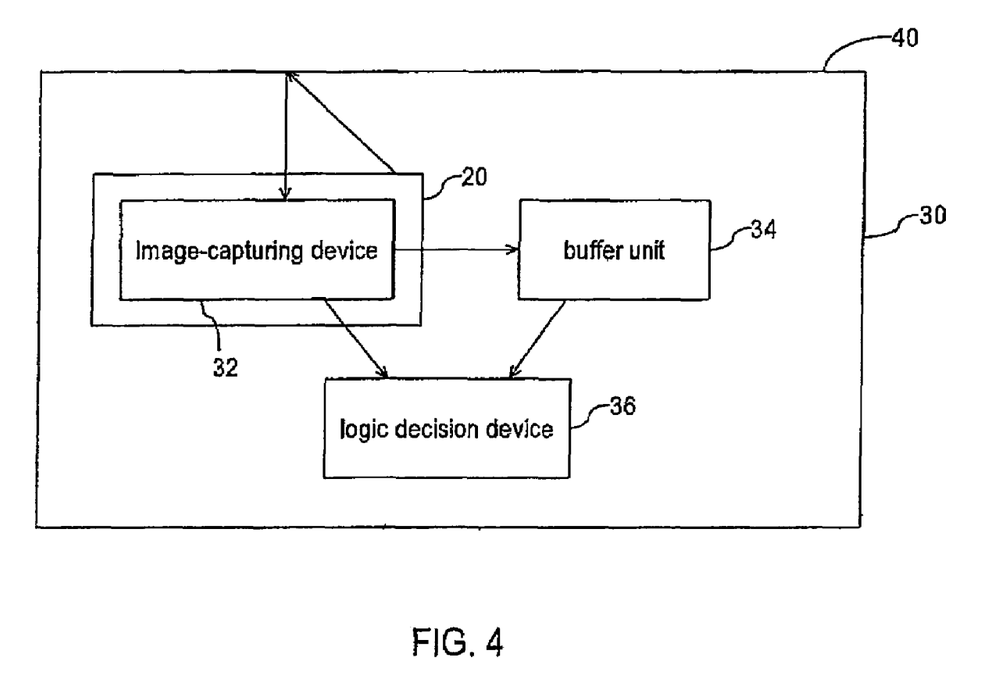
FIG. 4 is a block diagram showing a scanner designed according to one preferred embodiment of this invention.

FIG. 3 is a perspective view of a platform type scanner according to this invention. FIG. 4 is a block diagram showing a scanner designed according to one preferred embodiment of this invention. As shown in FIGS. 3 and 4, the scanning device is a platform type scanner having a scanning platform 40 for holding a static image such as a scan document. The automatic static image-capturing device includes a scanning head 20 and a decision logic device 36. The scanning head 20 is mounted somewhere underneath the scanning platform 40. The scanning head 20 can be driven across the scanning platform 40 by a driving element (not shown) after the power switch is triggered and can be seen as the upper platform cover is raised. The decision device 36 compares image data captured by the scanning head 20 in a previous time period and image data captured by the scanning head in a subsequent time period and shows up any difference between the two. Because a user may repeatedly change the focusing points of a static image while the document is unloaded onto the scanning platform 40, the scanning head 20 needs to sample the focusing points of the static image after each fixed timing cycle. Thus, the scanning head 20 shuttles to-and-fro underneath the scanning platform 40 for awhile before the end of a scanning operation. In this manner, new positions of a static image are continuously monitored.

The automatic static image capturing device further includes an image capture device 32 and a buffer unit 34. The image capture device 32 is coupled to the decision logic device 36 for obtaining static image data captured by the scanning head 20. The image capture device 32 can be, for example, a charge couple device (CCD) or a contact image sensor (CIS). However, any image-capturing device should also fall under the scope of this invention. The buffer unit 34 is coupled to the image capture device 32 and the logic decision device for holding image data captured by the image capture device 32 during a previous time interval.

Figure 5:
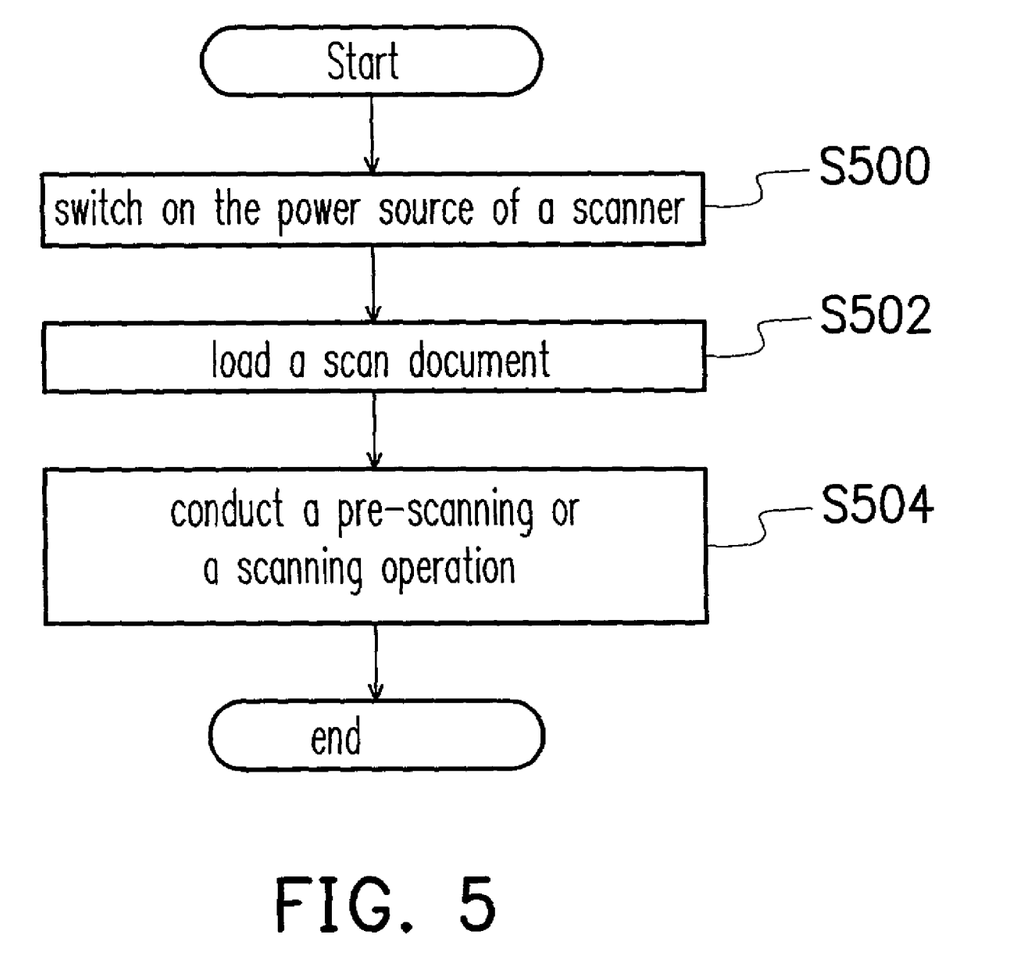
FIG. 5 is a diagram showing a sequence of steps followed by the scanner according to this invention.
Figure 6:
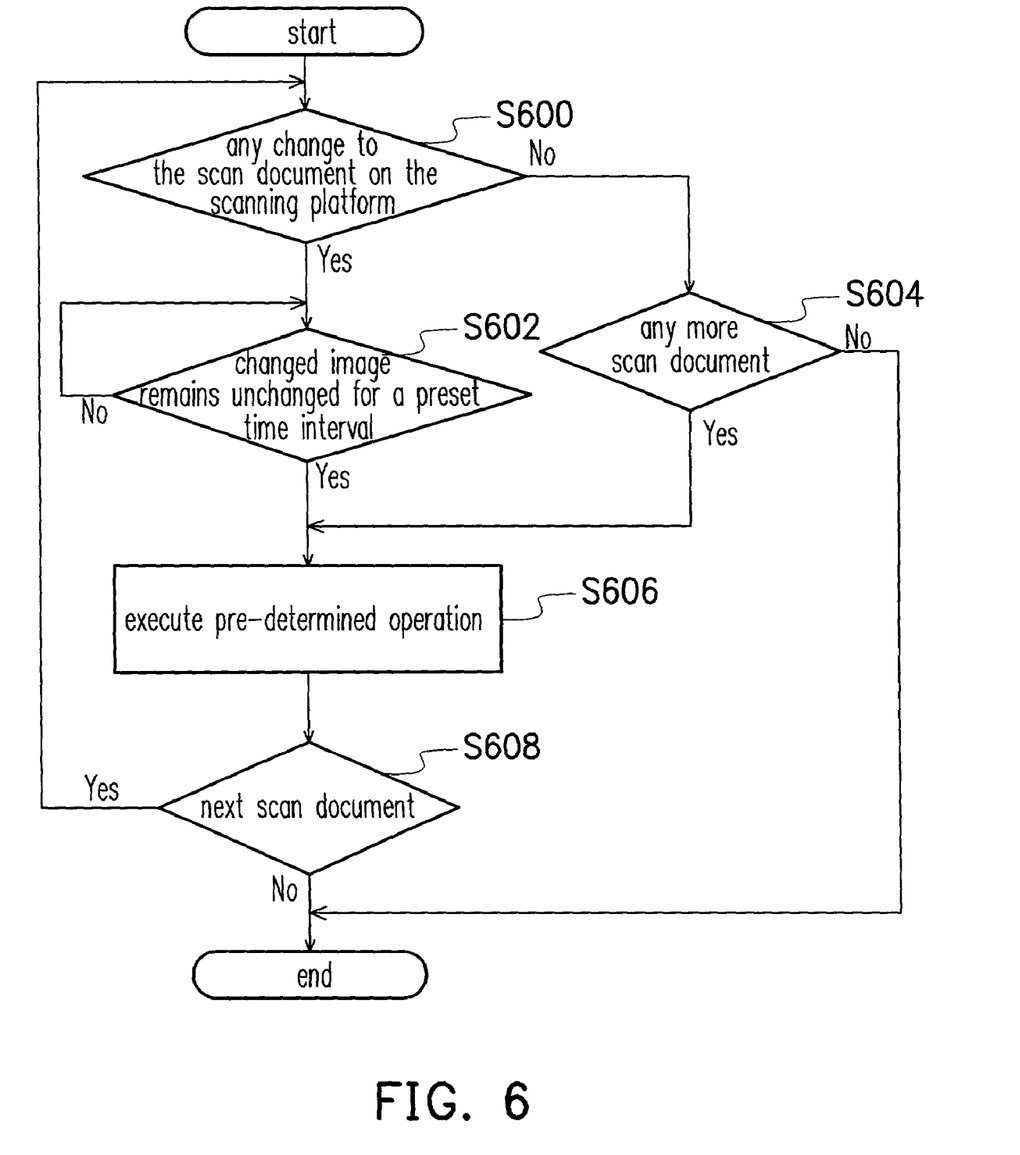
FIG. 6 is a diagram showing a sequence of steps superimposed upon the steps conducted by the scanner in FIG. 5.

FIG. 5 is a diagram showing a sequence of steps followed by the scanner according to this invention. FIG. 6 is a diagram showing a sequence of steps superimposed upon the steps conducted by the scanner in FIG. 5. The steps according to this invention can be applied to a scanner having a scanning platform for capturing static images automatically.

As shown in FIG. 5, a power switch of the scanner is switched on in step s500. In step s502, a document containing a static image is placed on the scanning platform. In step s504, a pre-scanning or a scanning operation is conducted.

The automatic static image capturing device further includes an image capture device 32 and a buffer unit 34. The image capture device 32 is coupled to the decision logic device 36 for obtaining static image data captured by the scanning head 20. The image capture device 32 can be, for example, a charge coupled device (CCD) or a contact image sensor (CIS). However, any image-capturing device should also fall under the scope of this invention. The buffer unit 34 is coupled to the image capture device 32 and the logic decision device for holding image data captured by the image capture device 32 during a previous time interval.

In step s604, the static image on the scanning platform remains static. The scanner then checks the scanning platform for any static image. If no more static image is detected on the scanning platform, no more preset action is executed. On the other hand, if a static image continues to be detected on the scanning platform, this indicates that the document is properly positioned initially and there is no need to readjust the position. Hence, preset action is executed directly in step s606.

After the preset action in step s606, the scanning platform is checked for any more static image requiring preset action in step s608. If there is one more static image to scan, control is returned to step s600 and any change in the static image on the scanning platform is continuously monitored until no more static image for preset action is present. In other words, the static image scanner automatically shuts down.

Figure 7:
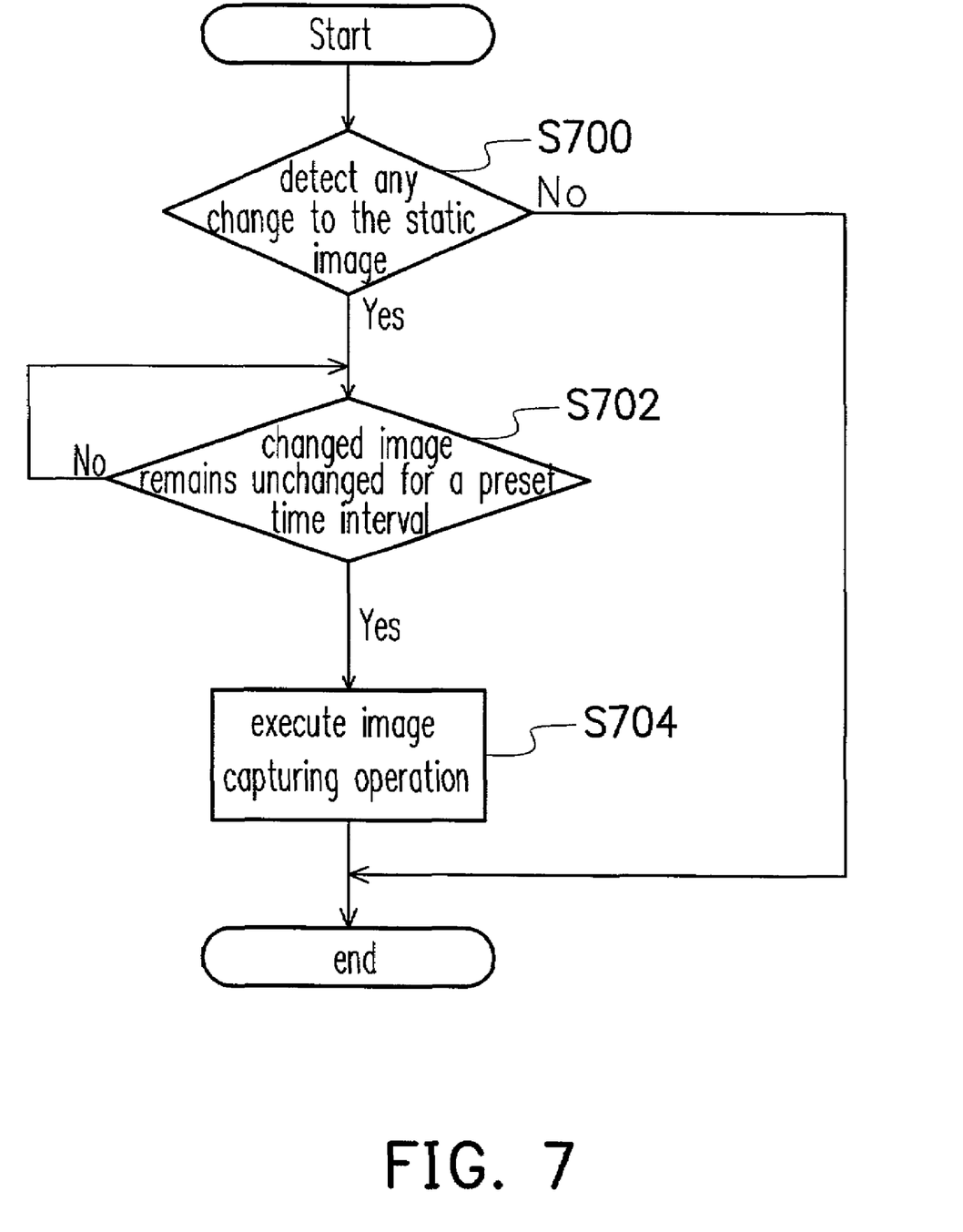
FIG. 7 is a diagram showing a sequence of steps for capturing a static scene by a digital camera according to this invention.

FIG. 7 is a diagram showing a sequence of steps for capturing a static scene by a digital camera according to this invention. The method aims to capture the static image of a scene and includes the following steps. In step s700, any changes in a static scene are continuously checked. If there is some change in the static scene, the change is gauged for a preset interval to check for any further change during this time interval in step s702. If there is no further change within this preset time interval, the static scene is captured in an image capturing operation in step s704. If continuous polling of the static scene in step s700 detects no changes, image-capturing actions in step s704 are always suspended.

In summary, major advantages of this invention include:
1. If the static image-capturing device is a scanner, the scanner will check for the presence of any static image continuously once the scanner is turned on. There is no need for a user to initiate a pre-scanning or a scanning operation because this is done automatically as long as the scan document is properly positioned. Since the scanning operation is triggered automatically, scanning time is shortened.
2. If the static image-capturing device is a digital camera, the camera is able to photograph changes in the static image such as a blossoming flower. Since the static scene is captured automatically, there is no need for the presence of a human photographer after the camera is properly set up.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of capturing a static image using a static image-capturing device, the method includes the steps of:
   detecting any changes in a static image;
   if the static image changes, determining if the changed image remains the same for a period of time;
   and if the changed image remains unchanged for the period of time, an image capturing operation is executed.

2. The method of claim 1, wherein the static image capturing device includes a digital camera.

3. The method of claim 1, wherein the static image capturing device includes a platform scanner.

4. A static image capturing device for a scanner having a scanning platform, the device comprising:
   a scanning head mounted underneath the scanning platform that shuttles across the scanning platform for continuous scanning of static image; and
   a logic decision device comparing the data of a first image captured at an earlier time with the data of a second image captured at a later time and finding their differences;
   wherein the logic decision device is capable of triggering at least one of a pre-scanning operation or a scanning operation, or combinations thereof, if the logic decision device finds no further difference between the first image and the second image a for pre-set interval after finding a difference.

5. The device of claim 4, wherein the static image capturing device further includes:
   an image capturing device, coupled to the logic decision device, for capturing the first image to provide the first image data and for capturing the second image to provide the second image data; and a buffer unit coupled to the image capturing device and the logic decision device for holding the first image data captured by the image capturing device in an earlier period.

6. The device of claim 5, wherein the image capturing device includes a charge coupled device.

7. The device of claim 5, wherein the image capturing device includes a contact image sensor.

8. The device of claim 4, wherein the image data includes focusing positions of the static image on the scanning platform.

9. The device of claim 4, wherein the earlier time and the later time are separated from each other by a fixed timing cycle.

10. An automatic static image capturing method for a scanner having a scanning platform, the method comprising the steps of:

detecting any changes in the static image on the scanning platform;

if the static image on the scanning platform changes, determining if the changed image remains the same for a period of time;

and if the changed image remains unchanged for the period of time, a predetermined operation is executed.

11. The method of claim 10, wherein the predetermined operation includes pre-scanning the static image.

12. The method of claim 10, wherein the predetermined operation includes scanning the static image.

13. The method of claim 10, wherein if the static image on the scanning platform remains unchanged, the automatic static image capturing method includes:

detecting the presence of any static image on the scanning platform;

if the scanning platform contains a static image, the pro-determined operation is executed;

and if the scanning platform does not contain any static image, the predetermined operation is skipped.

14. The method of claim 10, wherein if the static image continues to change before the end of a preset period, execution of the pro-determined operation is delayed until the changed static image remains identical for the preset period.

15. The method of claim 10, wherein if some other static images need the pre-determined operation to be performed, the scanner continues to detect any change in static image on the scanning platform until no more pro-determined operation of the static image is required.

* * * * *

UNITED STATES PATENT AND TRADEMARK OFFICE
CERTIFICATE OF CORRECTION

PATENT NO. : 7,139,107 B2
APPLICATION NO. : 09/967569
DATED : November 21, 2006
INVENTOR(S) : Kuo et al.

It is certified that error appears in the above-identified patent and that said Letters Patent is hereby corrected as shown below:

At column 3, line 40, please delete "The automatic static image capturing device further includes an image capture device 32 and a buffer unit 34. The image capture device 32 is coupled to the decision logic device 36 for obtaining static image data captured by the scanning head 20. The image capture device 32 can be, for example, a charge coupled device (CCD) or a contact image sensor (CIS). However, any image-capturing device should also fall under the scope of this invention. The buffer unit 34 is coupled to the image capture device 32 and the logic decision device for holding image data captured by the image capture device 32 during a previous time interval."

Insert

--In step s502, after placing a static image on the scanning platform, the automatic static image capture further includes the steps shown in FIG. 6. In step s600, any change of the static image on the scanning platform is checked for. In other words, any further correction of static image position by a user is checked after the document is put on the scanning platform. If there is some change, step s602 is executed to check if there is any further change within a preset period. If no more changes are detected at the end of the period, preset actions such as pre-scanning or scanning are triggered in step s606. However, if the static image continues to change before the end of the preset interval, the preset interval is waited anew until a preset interval is passed without further changes.--

Signed and Sealed this

Fifth Day of August, 2008

JON W. DUDAS
*Director of the United States Patent and Trademark Office*